Feb. 2, 1954 — C. H. MURRAY ET AL — 2,667,859
CATTLE AND HOG INSECTICIDE APPLICATOR
Filed Sept. 19, 1952
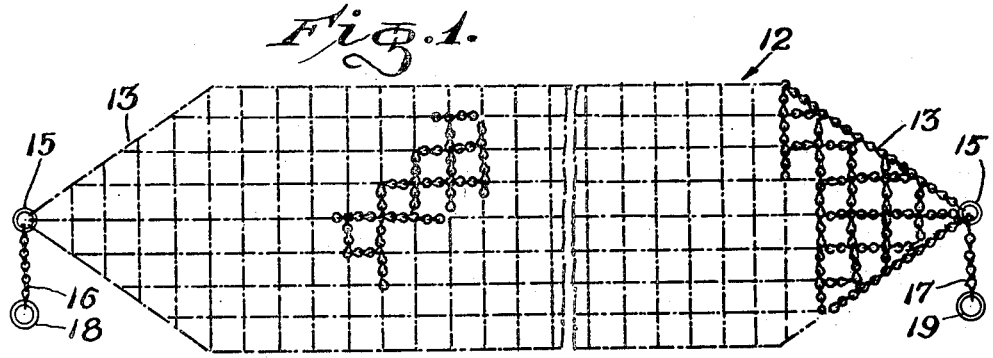
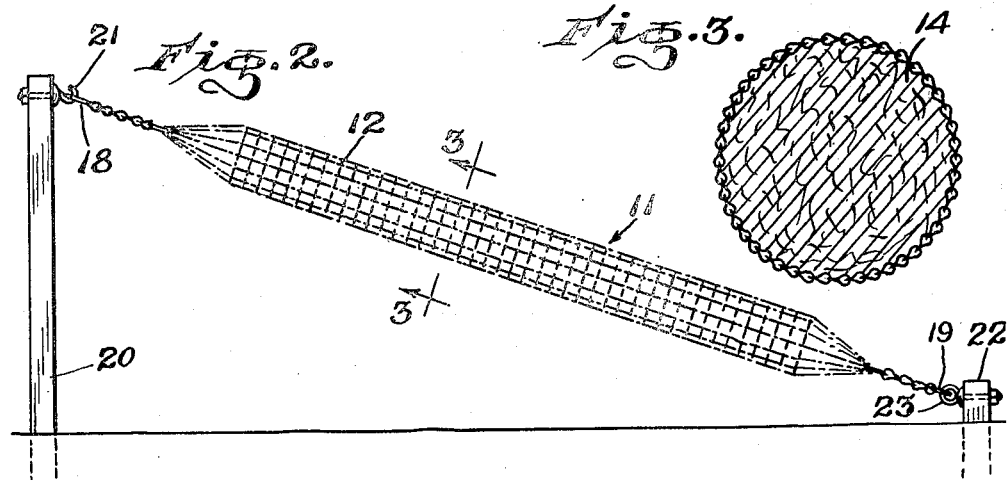
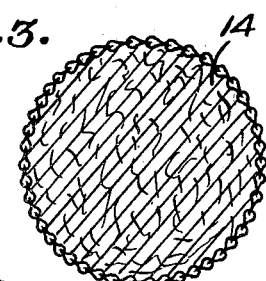
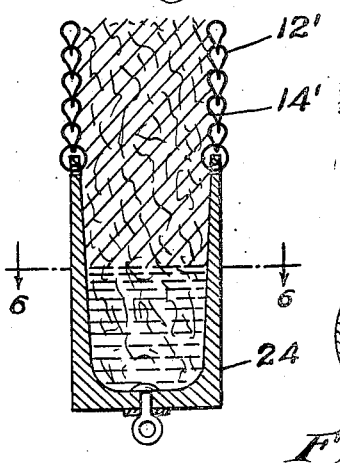
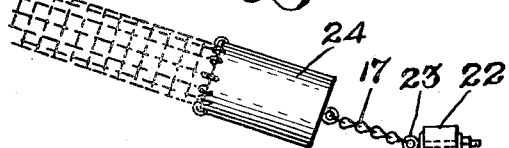
Charles H. Murray
Donald E. Breithaupt
INVENTORS
BY
McMorrow, Berman + Davidson
ATTORNEYS Patented Feb. 2, 1954

2,667,859

UNITED STATES PATENT OFFICE 2,667,859

CATTLE AND HOG INSECTICIDE APPLICATOR

Charles H. Murray, Scott City, and Donald E. Breithaupt, Modoc, Kans.

Application September 19, 1952, Serial No. 310,402

1 Claim. (Cl. 119—157)

This invention relates to insecticide applicators, and more particularly to an improved insecticide applicator suitable for use by cattle, such as hogs or the like.

A main object of the invention is to provide a novel and improved insecticide applicator for farm animals, said applicator being simple in construction, being easy to install, and being durable in construction.

A further object of the invention is to provide an improved insecticide applicator for farm animals, said applicator being inexpensive to manufacture, requiring a minimum amount of replenishment of the insecticide employed therewith, and providing an efficient distribution of the insecticide thereof on the animal engaging the applicator.

Further objects and advantages of the invention will become apparent from the following description and claim, and from the accompanying drawings, wherein:

Figure 1 is a fragmentary top plan view of the protective cover of an applicator according to the present invention, the cover being shown unrolled to an open position.

Figure 2 is a side elevational view of an applicator according to the present invention, shown installed and in operative position.

Figure 3 is an enlarged transverse vertical cross sectional view taken on the line 3—3 of Figure 2.

Figure 4 is a fragmentary side elevational view of the lower end portion of a modified form of insecticide applicator constructed in accordance with the present invention.

Figure 5 is an enlarged longitudinal vertical cross sectional view taken through the cup portion of the applicator structure shown in Figure 4.

Figure 6 is a cross sectional view taken on the line 6—6 of Figure 5.

Referring to the drawings, and more particularly to Figures 1, 2 and 3, the applicator illustrated therein is designated generally at 11 and comprises an elongated foraminous, flexible container 12 which may, for example, consist of a tubular sleeve-like member formed of meshed chain links. As shown in Figure 1, the protective cover may be formed of a body of chain mesh having the tapered ends 13, 13, the intermediate portion of the body being substantially rectangular. It will be apparent that the opposite longitudinal edges of the cover may be connected, as well as the opposite tapering edges of the ends 13, 13, to define the tubular envelope.

The envelope thus defined contains a mass of deformable absorbent material impregnated with liquid insecticide, such as, for example, burlap, felt, or similar absorbent deformable material which is adapted to absorb liquid insecticide. The deformable absorbent material is shown at 14.

Each end of the foraminous flexible envelope 12 is provided with a ring 15, and connected to the respective rings are the respective chains 16 and 17 terminating in respective rings 18 and 19. Designated at 20 is a first vertical post member provided at its top end with a hook 21 with which the ring 18 is engaged. Designated at 22 is a relatively short vertical post provided with a hook 23 with which the ring 19 is engaged, as shown in Figure 2. Thus, the insecticide applicator is supported in an inclined position and is arranged so that an animal may pass beneath the applicator and rub thereagainst, the force exerted by the animal on the applicator serving to contract the foraminous flexible envelope 12 and to squeeze liquid from the deformable absorbent material 14 contained therein. Thus, as the animal passes against the applicator, the liquid is squeezed out of the absorbent material 14 and is distributed on the animal's body.

It will be understood that in the form of the invention shown in Figures 1, 2 and 3, the applicator may be dipped into a suitable container containing the liquid insecticide, whereby the absorbent material 14 becomes saturated with the liquid. The foraminous protective cover 12 serves to protect the absorbent material 14 against wear and thus serves to prolong the life of the applicator. The foraminous cover 12 prevents direct contact of the live stock with the deformable absorbent material 14 while allowing the live stock to exert force against the applicator to squeeze the material 14, and thus to cause the liquid insecticide to be distributed on the animal as it rubs against the applicator.

Referring now to the form of the invention shown in Figures 4, 5 and 6, a rigid cup member 24 is secured to the lower end of the protective cover, shown at 12', and is arranged to partially receive the deformable absorbent material, shown at 14'. Since the applicator is mounted in an inclined position, as in the form of the invention shown in Figures 1, 2 and 3, the cup 24 serves as a reservoir for insecticide liquid, the liquid being impregnated through the absorbent material 14' by capillary diffusion therethrough, the liquid being drawn from the cup 24 by capillary action in the manner of a wick. Thus, the material 14' may be supplied with insecticide liquid over a long period of time by providing the cup 24 with an initial supply of insecticide liquid. As in the previously described form of the invention, the foraminous cover 12' serves to protect the deformable absorbent material 14' against wear and also serves to transmit squeezing force to the deformable absorbent material as the livestock rubs against the foraminous cover 12', thus forcing liquid out of the absorbent material 14' onto the body of the animal.

While certain specific embodiments of an improved insecticide applicator have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An insecticide applicator comprising a pair of upstanding support members, an elongated foraminous, flexible container, said container comprising a tubular sleeve-like member of meshed chain links, a rigid cup member secured to one end of said container and adapted to contain liquid insecticide, means connecting the other end of the container to one of said support members and the cup member to the other of said support members to support the container in an inclined, substantially taut position with the cup member at the lower end of the container, and a mass of deformable absorbent material impregnated with liquid insecticide filling said container, a portion of said material being received in said cup member, whereby said insecticide is squeezed out of said absorbent material by rubbing contact with the body of an animal.

CHARLES H. MURRAY.
DONALD E. BREITHAUPT.

References Cited in the file of this patent

UNITED STATES PATENTS

| Number | Name | Date |
|---|---|---|
| 1,471,109 | Dick | Oct. 16, 1923 |
| 1,543,601 | Clements | June 23, 1925 |
| 2,573,873 | Rhoades | Nov. 6, 1951 |
| 2,581,028 | Kirk | Jan. 1, 1952 |
| 2,632,063 | Peterson | Mar. 17, 1953 |